United States Patent
Zhang et al.

(10) Patent No.: US 11,303,604 B2
(45) Date of Patent: Apr. 12, 2022

(54) ADVANCED RESOURCE SELECTION

(71) Applicant: Conviva Inc., Foster City, CA (US)

(72) Inventors: Hui Zhang, Pittsburgh, PA (US);
Aditya Ravikumar Ganjam, San Francisco, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 15/080,452

(22) Filed: Mar. 24, 2016

(65) Prior Publication Data

US 2016/0316006 A1    Oct. 27, 2016

Related U.S. Application Data

(60) Provisional application No. 62/141,218, filed on Mar. 31, 2015.

(51) Int. Cl.
| | | |
|---|---|---|
| *H04L 29/12* | (2006.01) | |
| *H04L 61/4511* | (2022.01) | |
| *H04L 101/33* | (2022.01) | |
| *H04L 61/301* | (2022.01) | |

(52) U.S. Cl.
CPC ........ *H04L 61/1511* (2013.01); *H04L 61/301* (2013.01); *H04L 61/304* (2013.01)

(58) Field of Classification Search
CPC ... H04L 61/1511; H04L 61/301; H04L 61/304
USPC ................. 709/225–227, 217, 232
See application file for complete search history.

(56) References Cited

U.S. PATENT DOCUMENTS

| | | | |
|---|---|---|---|
| 6,560,596 B1 * | 5/2003 | Margulies | G06F 17/30569 707/690 |
| 7,873,734 B1 | 1/2011 | Eidelman et al. | |
| 8,224,994 B1 * | 7/2012 | Schneider | G06Q 30/02 709/217 |
| 8,533,361 B1 * | 9/2013 | Roskind | H04L 61/106 709/245 |
| 8,688,802 B2 | 4/2014 | Sureshchandra | |
| 9,231,903 B2 | 1/2016 | Seastrom | |
| 9,270,646 B2 * | 2/2016 | Shelest | H04L 29/12066 |
| 10,230,819 B2 * | 3/2019 | Richardson | H04L 67/327 |
| 2002/0147929 A1 | 10/2002 | Rose | |
| 2008/0177897 A1 * | 7/2008 | Karandikar | H04L 67/02 709/238 |
| 2009/0063457 A1 | 3/2009 | Stewart et al. | |
| 2010/0306368 A1 | 12/2010 | Gagliardi | |
| 2012/0198043 A1 * | 8/2012 | Hesketh | H04L 67/1014 709/223 |

(Continued)

FOREIGN PATENT DOCUMENTS

EP    2575302 A1 *   4/2013   ............. H04L 65/80

OTHER PUBLICATIONS

Antonakakis, Manos, Roberto Perdisci, David Dagon, Wenke Lee, and Nick Feamster. "Building a Dynamic Reputation System for DNS." In USENIX security symposium, pp. 273-290. 2010.*

*Primary Examiner* — Suraj M Joshi
*Assistant Examiner* — Melaku Y Habtemariam
(74) *Attorney, Agent, or Firm* — Van Pelt, Yi & James LLP

(57) ABSTRACT

Advanced resource selection is disclosed. A request from a client to resolve an augmented domain is received at a Domain Name System (DNS) server. Information is extracted from the augmented domain name. The extracted information is used to select a particular resource from a set of resources to provide content to the client.

12 Claims, 8 Drawing Sheets

(56) References Cited

U.S. PATENT DOCUMENTS

| | | | |
|---|---|---|---|
| 2012/0226734 A1* | 9/2012 | Poese | H04L 61/1511 |
| | | | 709/201 |
| 2013/0046748 A1 | 2/2013 | Bennett | |
| 2013/0286879 A1* | 10/2013 | ElArabawy | H04W 28/0289 |
| | | | 370/252 |
| 2013/0290563 A1 | 10/2013 | Fleischman et al. | |
| 2013/0336221 A1* | 12/2013 | Damola | H04L 29/12066 |
| | | | 370/328 |
| 2014/0244849 A1* | 8/2014 | Rizzo | H04L 65/602 |
| | | | 709/226 |
| 2014/0358678 A1 | 12/2014 | Raab et al. | |

* cited by examiner

ADVANCED RESOURCE SELECTION

CROSS REFERENCE TO OTHER APPLICATIONS

This application claims priority to U.S. Provisional Patent Application No. 62/141,218 entitled ADVANCED RESOURCE SELECTION filed Mar. 31, 2015 which is incorporated herein by reference for all purposes.

BACKGROUND OF THE INVENTION

Achieving high quality content streaming on the Internet can be challenging. For example, distributors of content may be limited in the information that they can use when determining how to serve content to clients. This can result in sub-optimal decisions on serving content, potentially leading to poor streaming performance and quality.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
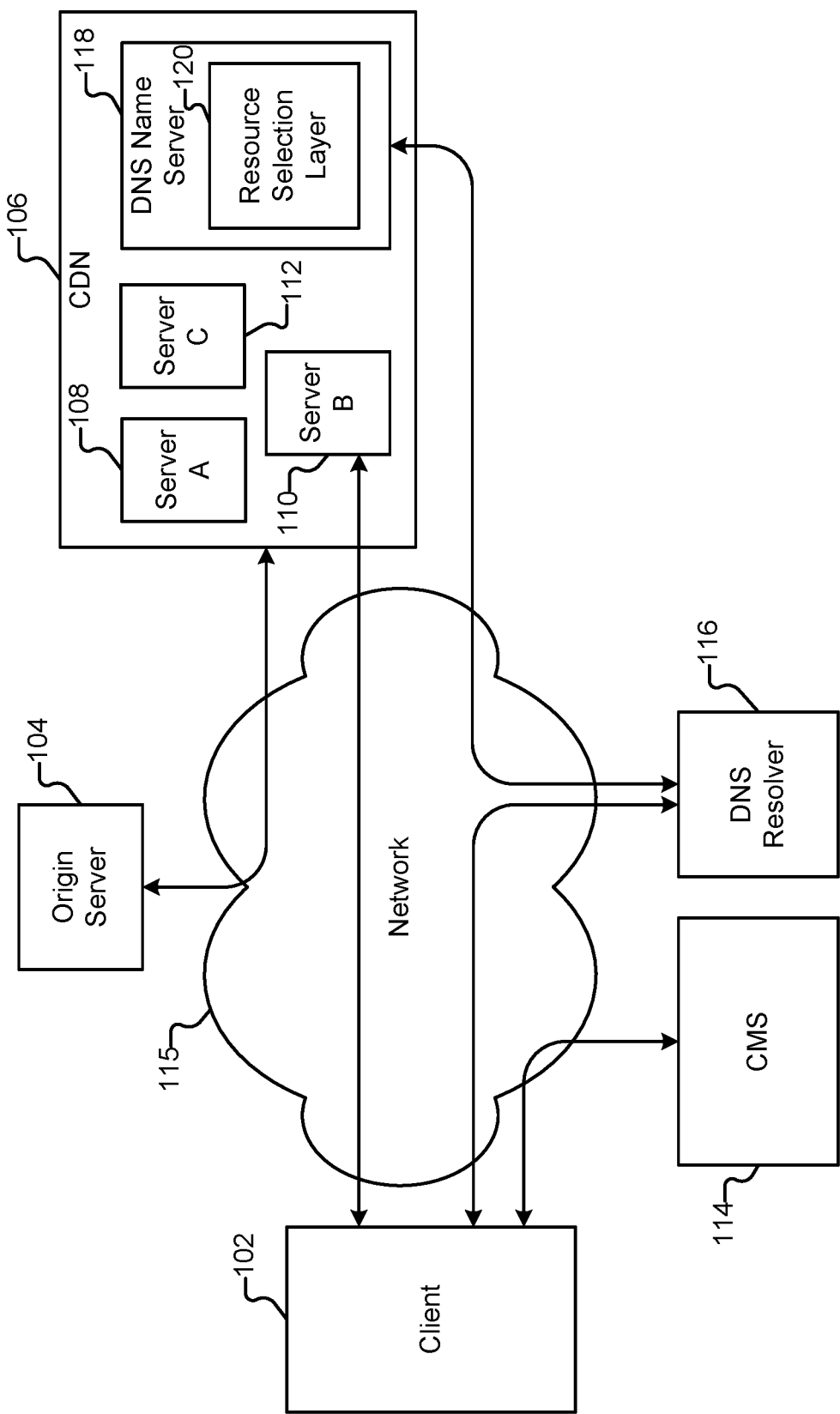
FIG. 1 illustrates an embodiment of an environment in which content is distributed.

FIG. 1 illustrates an embodiment of an environment in which content is distributed. In the example shown, client 102 is used to access content, such as multimedia or audio-visual content (e.g., movies, songs, television shows, sporting events, games, images, etc.) that is owned by content owners. The content is stored (or captured) at origin servers such as origin server (104), and distributed via content sources such as content distribution network (CDN) 106. A content owner is also referred to herein as a "content publisher," as the content owner publishes its content using content sources such as CDN 106. In the example shown, CDN 106 includes a set of servers A (108), B (110), and C (112) (also referred to herein as "resources") that serve content. Servers A, B, and C of CDN 106 may be in various geolocations around the world.

Examples of clients include personal computers, laptops, cellular phones/personal digital assistances, and other types of information appliances or devices such as set-top boxes, games consoles, broadband routers, file servers, video servers, and digital video recorders, as applicable.

In the example shown, a television network ("XYZ") (a content owner/publisher) has contracted with CDN 106 to provide viewers with access to live streams of its broadcasts, as well as streams of television show episodes and sporting events.

Suppose a user of client 102 would like to watch an episode of a drama owned by XYZ called "exampledrama." Client 102 includes a web browser application. Alice uses the web browser application to navigate, over network 115 (e.g., the Internet), to a content management system (CMS) 114 operated by XYZ. In response to her request for the episode, the CMS provides client 102 with a URL (Universal Resource Locator) "a.cdn.net/exampledrama," which includes the actual domain name (or host name) that is used as the primary identifier for CDN 106 ("a.cdn.net") and a path to the content.

Client 102 is configured to use the URL provided by the CMS to make a DNS (Domain Name System) request to obtain an IP (Internet Protocol) address for the URL. In the example shown, client 102 contacts DNS resolver 116, requesting DNS resolver 116 to resolve the URL "a.cdn.net/content" and provide to client 102 an IP address that client 102 can use to obtain the requested content. In the example shown, DNS resolver 116 is configured to (recursively) query a hierarchy of DNS name servers until a DNS name server that can resolve the hostname "a.cdn.net" and return an IP address for the hostname is found. The resolved IP address is returned to DNS resolver 116, which in turn provides the IP address to client 102, which then uses the IP address to obtain the requested content. DNS resolvers can be provided by DNS providers or services such as Google Public DNS, Open DNS, ISPs (Internet Service Providers), etc.

In this example, resolver 116 is a server that contacts a root name server (not shown) (whose IP address is cached by resolver 116) and requests it to resolve the hostname "a.cdn.net" (e.g., perform a DNS lookup). Suppose that the root name server is unable to resolve the hostname, and instead refers resolver 116 to a top level domain (TLD) name server (not shown) that is configured to handle ".net" domain requests. (If, for example, resolver 116 has cached the IP address of the .net TLD name server, resolver 116 can skip querying the root name server and directly visit the TLD name server). Suppose that the TLD name server is also unable to resolve the hostname ("a.cdn.net"), and instead refers resolver 116 to DNS name server 118, which, in this example, is an authoritative name server within CDN 106 that is configured to answer queries for hostnames under the "CDN.net" domain. Each time that DNS resolver 116 communicates with a DNS name server, the DNS name server is passed the entire hostname string for performing DNS lookup or resolution.

In this example, DNS name server 118 within CDN 106 includes a resource selection layer 120. Resource selection layer 120 is configured to resolve the queried-for URL hostname by providing an IP address of an appropriate resource to serve requested content to client 102. Layer 120 includes logic that is configured to select, based on the queried-for hostname ("a.cdn.net") and the location of DNS resolver 116 (determined from the IP address of DNS resolver 116, which is obtained by DNS name server 118 when it is queried by DNS resolver 116), one of resources A (108), B (110), and C (112) as an appropriate server to serve content to client 102. In this example, suppose that server B is selected, as it is the closest server (geographically) to DNS resolver 116. The IP address of server B is then returned to DNS resolver 116, which in turn provides the IP address of server B to client 102 (i.e., the URL is resolved because an IP address has been provided in response to the DNS request for DNS lookup of the URL "a.cdn.net/exampledrama"). Client 102 is then configured to contact server B using the IP address and request the episode of the drama. Server B then provides (e.g., streams) the episode to client 102.

In this example, DNS name server 118, using resource selection layer 120, has determined that the best server to use for serving the requested content to client 102 is server B. The resource selection has decided that the best server for client 102 is the server which is closest to client 102. However, as described above, resource selection layer 120 has access only to the queried-for hostname ("a.cdn.net") and the IP address of DNS resolver 116 when making the decision. Because the resource selection layer 120 does not have client 102's actual IP address, layer 120 instead treats the IP address of DNS resolver 116 as the IP address of client 102 to resolve client 102's location. In this example, based on the IP address of DNS resolver 116, the resource selection layer of DNS name server 118 selects server B, because it is the closest resource to the location of DNS resolver 116.

The use of the DNS resolver's IP address to approximate the location of client 102 may lead to inaccurate location mapping (in terms of geolocation and/or network mapping) of client 102. For example, DNS resolver 116 may not be in geographical proximity to client 102. As one example, DNS resolver 116 may be implemented as part of a distributed DNS service infrastructure and be located in a different geolocation than that of client 102, such as a different state or even a different country. Thus, because in many cases the DNS resolver is not close to the client, the resolution (selection of a resource) by DNS name server 118 may not be accurate. For example, suppose that DNS resolver 116 is located in Nevada. DNS name server 118 will then assume that client 102 is also located in Nevada when making a resource selection, even though client 102 is actually located in California. Thus, the selected resource may not be the one closest to the client geographically, resulting in slower streaming performance of the requested content.

Further, as described above, the DNS query that DNS name server 118 receives includes only the hostname ("a.cdn.net") of the URL provided by CMS 114, without any indication of metadata regarding the request, such as content related metadata (e.g., the name of the content being requested, the type of content being requested (e.g., live or video on demand), etc.), device related metadata (e.g., device type or model of client 102), user related metadata (e.g., user information, user preferences, etc.), etc. Thus, while the resource selection layer 120 of DNS name server 118 has selected server B based on the IP address of DNS resolver 116, it is possible that server B does not have the requested content cached. Thus, when client 102 uses the IP address of server B to contact server B and request content, if server B does not have the content, it must go to an origin server such as origin server 104 to fetch the content and then serve the fetched content to the client. This introduces latency in streaming the content, as it takes longer to obtain the requested content.

Thus, as described in the example of FIG. 1, resource selection layer 120 of DNS name server 118 has neither accurate client locations nor knowledge of the metadata regarding client requests to use when determining appropriate resources to serve content to clients such as client 102. This may result in sub-optimal selection of resources, for example, that are not close to clients and/or that may not have stored the content requested by the clients, resulting in poor streaming performance.

Described herein are techniques for passing information such as client IP address (or any other information usable to determine the geolocation of the client), content metadata (e.g., content name, content type (e.g., live or video on demand (VOD), etc.)), or any other metadata to a resource selection entity (e.g., resource selection layer 120) of a CDN for advanced resource selection. Other examples of metadata that can be passed to a CDN for advanced resource selection using the techniques described herein include client device information (e.g., device type such as smartphone, set-top box, game console, etc.), network information (e.g., Internet Service Provider (ISP)), and user information such as user subscriber information (e.g., associated with a user's account with a streaming service) and user preferences, etc. Another example of metadata that can also be provided to a CDN for advanced resource selection using the techniques described herein is QoE (Quality of Experience) information, such as information associated with re-buffering, interrupts, or any other data (such as metrics and measures) indicative of the quality of a user's viewing experience. Another example of metadata that can also be provided to a CDN for advanced resource selection using the techniques described herein is network information (e.g., ISP of the client or network connection type such as 3G, 4G, LTE, etc.). Such information can be associated with session identifiers (IDs) of a streaming session, which can also be passed to a CDN using the techniques described herein.

While example embodiments in a video streaming (e.g., live and on-demand streaming) ecosystem are described below, the techniques described herein can variously be adapted to accommodate any type of audiovisual or multimedia content distribution, as applicable.

Four example techniques for facilitating advanced resource selection are described below. The first three example techniques, described in conjunction with FIGS. 2A-2C and FIG. 3, describe techniques for encoding information such as client IP address, content metadata, device metadata, user metadata, QoE metadata, etc. into URLs such that existing DNS infrastructures (such as that described in conjunction with FIG. 1) can be used to deliver the information to a CDN. In the first three example techniques, the logic to extract and interpret such encoded information to perform advanced resource selection is implemented as part of a resource selection layer of a DNS name server such as DNS name server 118.

Figure 4A:
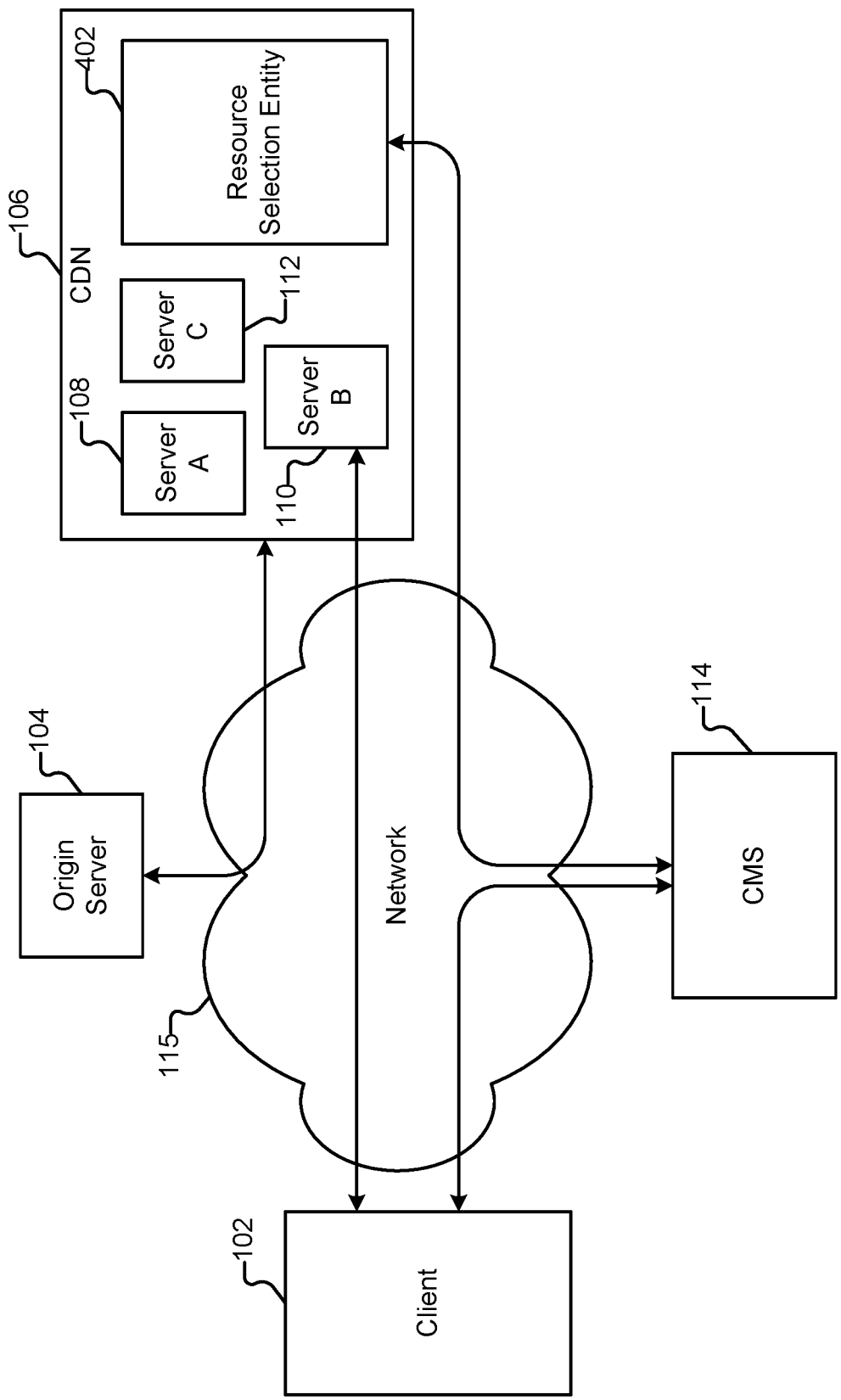
FIG. 4A illustrates an embodiment of an environment in which advanced resource selection is facilitated.
Figure 4B:
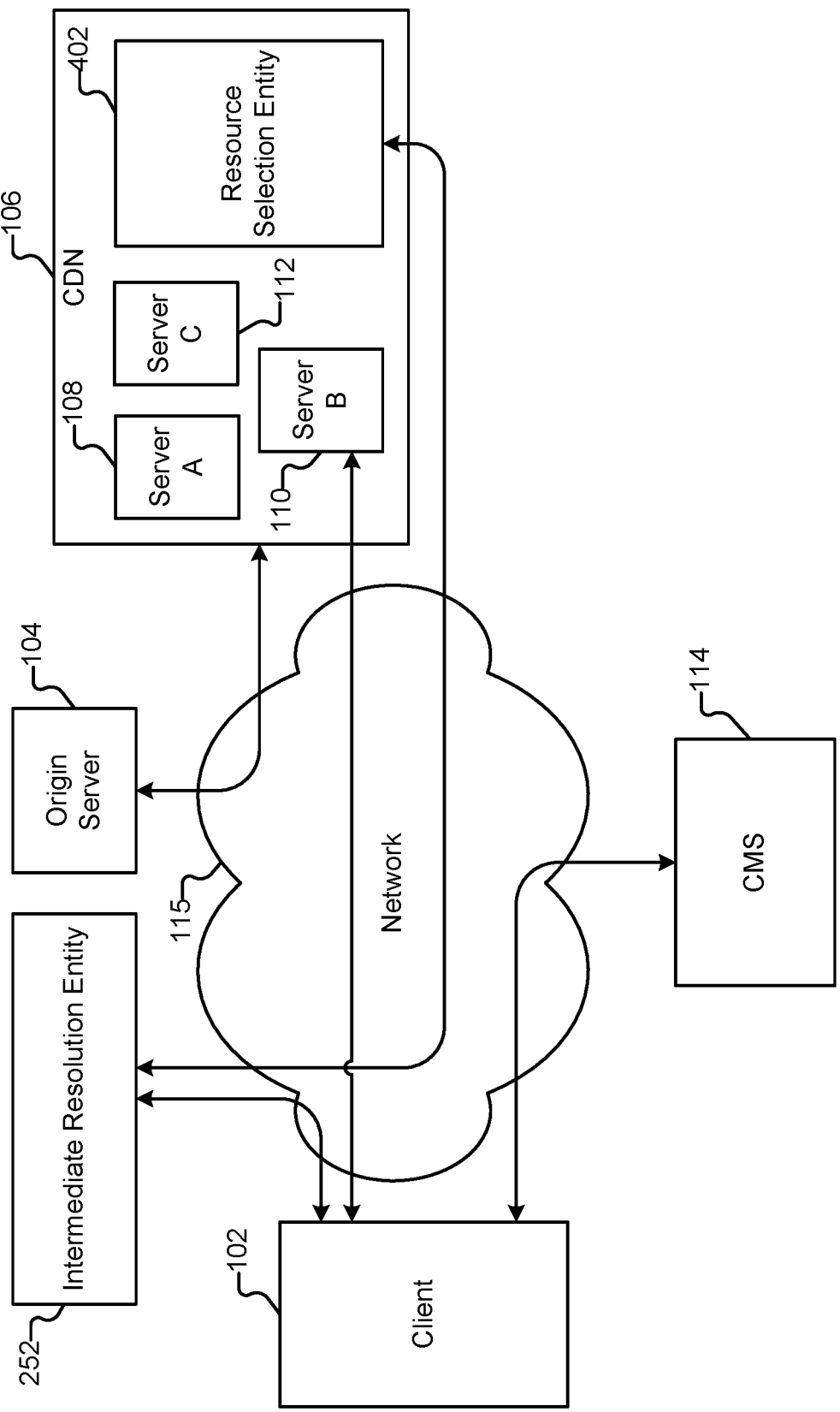
FIG. 4B illustrates an embodiment of an environment in which advanced resource selection is facilitated.
Figure 5:
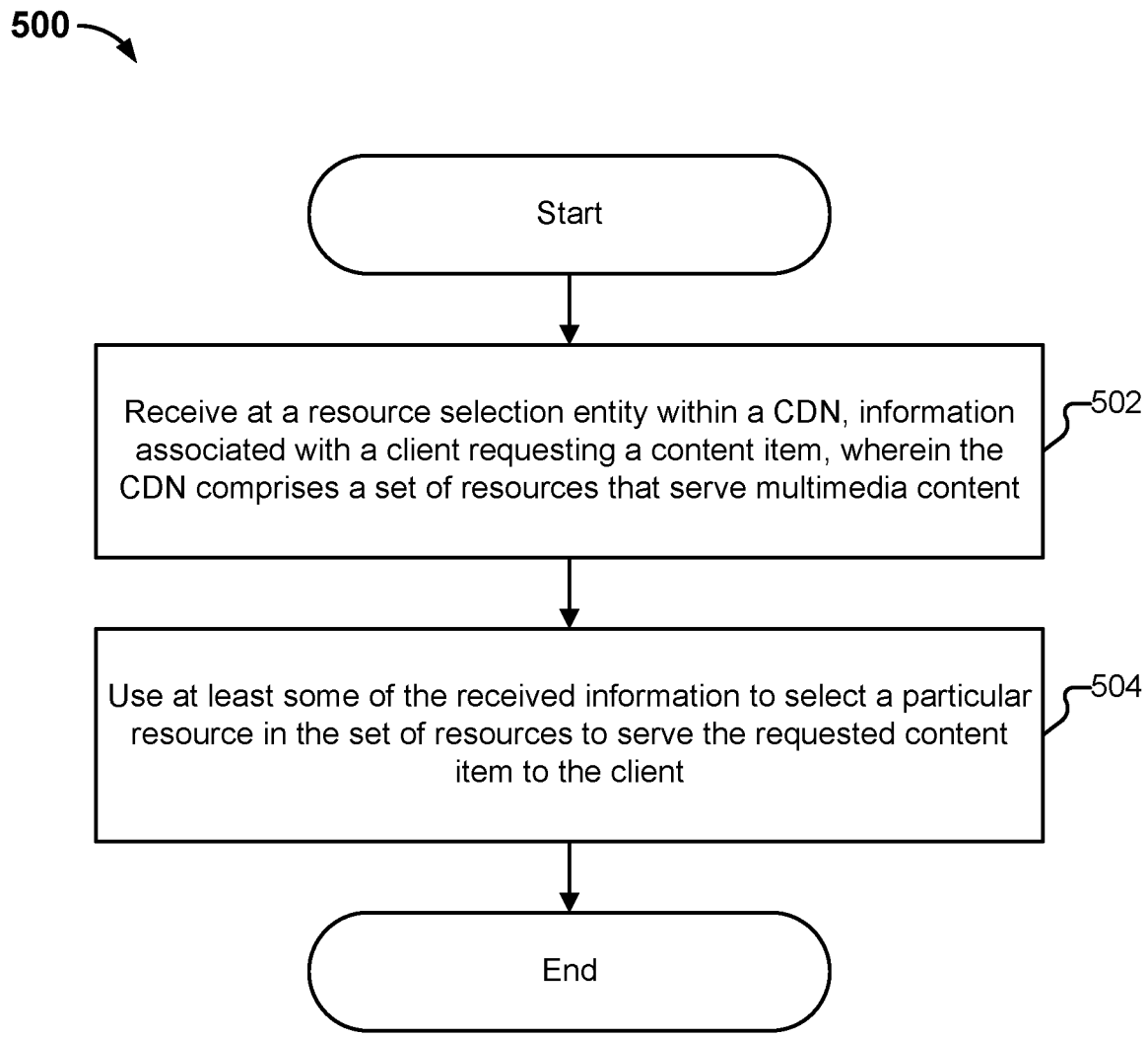
FIG. 5 is a flow diagram illustrating an embodiment of a process for advanced resource selection.

The fourth example technique, described in conjunction with FIGS. 4A-4B and FIG. 5, describes a technique by which client IP address, content metadata, or any other metadata can be provided to a CDN directly, bypassing DNS infrastructure. As will be described in more detail below, in some embodiments, the information is communicated directly by an entity in possession of the client IP address, content name, or any other metadata to a CDN via a custom protocol, where the CDN includes a resource selection entity that can process and utilize information provided via the custom protocol to perform advanced resource selection.

The various example techniques described herein can be utilized independently or jointly to facilitate advanced resource selection.

While example embodiments in which client IP address and content name are passed are described below, the techniques described herein can variously be adapted to accommodate any type of metadata (such as other content metadata, device metadata, user metadata, performance metadata, etc. as described above), as applicable.

First Example Technique—Modifying the Client

Figure 2A:
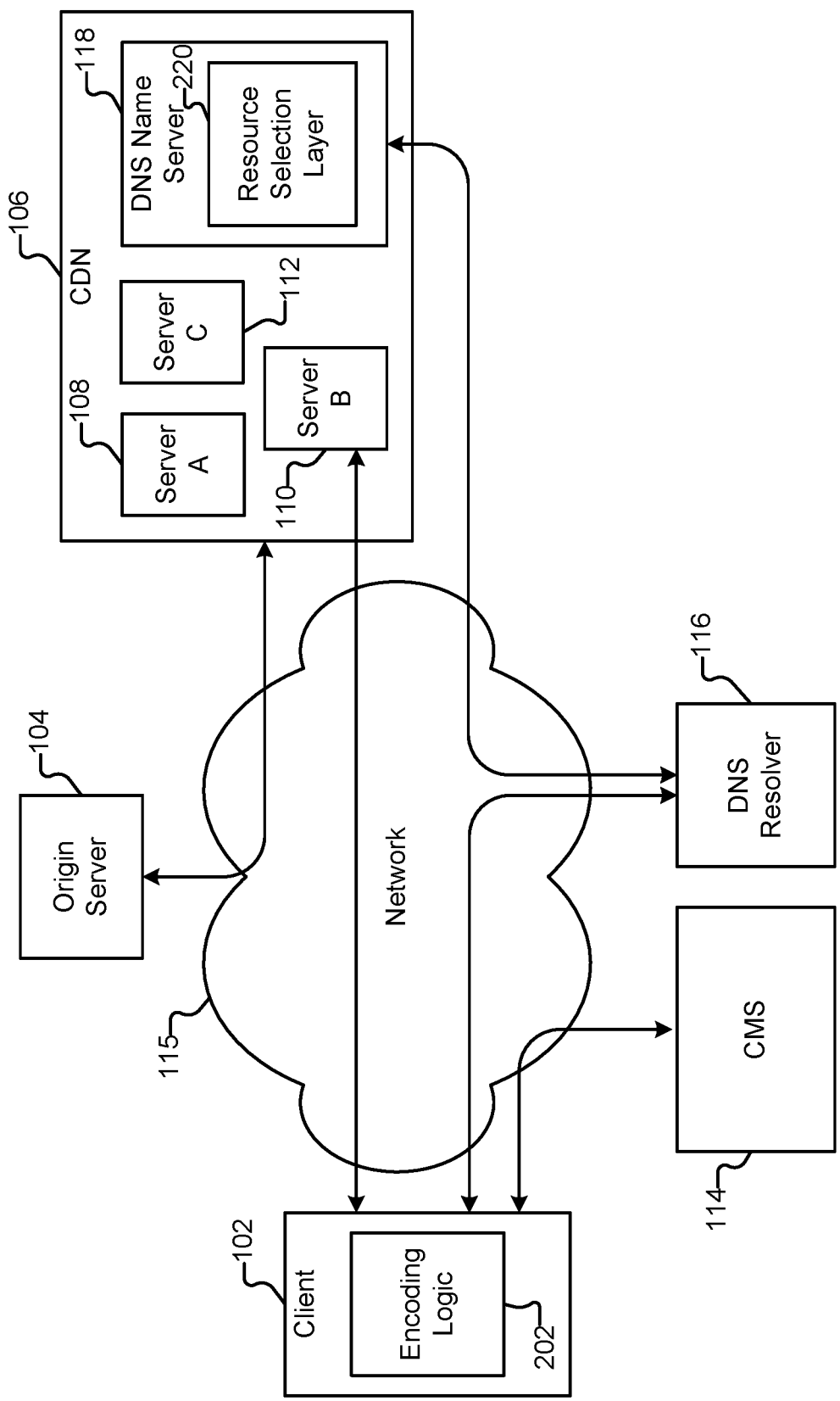
FIG. 2A illustrates an embodiment of an environment in which a first technique for facilitating advanced resource selection is performed.

FIG. 2A illustrates an embodiment of an environment in which a first technique for facilitating advanced resource selection is performed. In this example, similarly to the example environment of FIG. 1, client 102 contacts CMS 114 to request content. CMS 114 provides client 102 with the URL "a.cdn.net/exampledrama." In the example of FIG. 2A, client 102 is augmented or modified with additional encoding logic 202 that is configured to retrieve client 102's IP address (for example, through an external service to obtain client 102's public IP address). The encoding logic is configured to modify or augment the basic domain name or hostname string ("a.cdn.net") of the URL provided by CMS 114 to create a new version of the hostname that includes the IP address of client 102, the requested content, and/or any other client metadata.

Suppose, for example, that the IP address of client 102 is 1.2.3.4. The encoding logic 202 resident on client 102 is configured to augment the URL "a.cdn.net/exampledrama" by inserting the IP address into the hostname or domain name string (e.g., by pre-pending the IP address to the hostname), resulting, for example, in a new URL "1.2.3.4.a.cdn.net/exampledrama" being generated. Other content and client metadata can be encoded into the URL by similarly augmenting the hostname string. For example, the name of the content "exampledrama" can also be prepended to the hostname. The hostname of the URL provided by CMS 114 can be augmented by encoding logic 202 of client 102 to include the content name, resulting in the following example URL hostname to be resolved: "exampledrama.1.2.3.4.a.cdn.net."

As the existing DNS infrastructure is configured to pass the entire hostname of the URL when querying DNS name servers, the new client, content, and/or device metadata encoded in the hostname string will be passed to DNS name server 118 when it is queried by DNS resolver 116. In the example of FIG. 2A, resource selection layer 220 of DNS name server 118 is an example of layer 120 of FIG. 1, modified with additional logic that is configured to parse augmented domain names and extract information encoded in the augmented domain names (e.g., client IP address, content metadata, or any other metadata encoded in an augmented domain name/hostname). Resource selection layer 220 is also configured to interpret and utilize the extracted information to perform resource selection and DNS resolution (e.g., return the IP address of a selected resource).

For example, now that resource selection layer 220 of DNS name server 118 has been passed the IP address of client 102 and the name of the requested content (which layer 220 is now configured to extract and interpret from the augmented domain name), layer 220 can use the information encoded in the hostname to make a decision on which of resources A (108), B (110), and C (112) to select and provide to client 102 based on both content and client IP address.

In one example embodiment, layer 220 uses the IP address of client 102 to identify resources close (based on geographical proximity) to client 102. The use of the client's actual IP address allows for a more accurate determination of client 102's location. The extracted content name is used to select, from the nearby servers, a server that has the content that the user of client 102 is requesting. The CDN is aware of the content that is available on each resource or server, as they own or otherwise manage the resources.

In another example embodiment, layer 220 first uses the extracted content name to select a set of servers that have the requested content. Client 102's actual IP address, extracted from the augmented hostname is then used to select the server closest to client 102.

Thus, the resource selection layer 220 selects the resource closest (in geographical proximity) to the client that also has stored or cached the requested content. As another example of a decision that can be made by layer 220 using actual client IP addresses and metadata such as content name, suppose that none of the servers close to client 102 (based on client 102's actual IP address) have the requested content. However, a server further away (e.g., in the next state) has the content. Rather than selecting a server that is far away from the client but has the content, layer 220 can instead select the server closest to client 102, and have the selected server fetch the content (e.g., from origin server 104).

The ability to use actual client IP address and other metadata such as content name when performing resource selection is in contrast to the example environment of FIG. 1, in which resource selection layer 120 had access only to the IP address of DNS resolver 116.

Resource selection layer 220 of DNS name server 118 then resolves the augmented URL by returning the IP address of the selected resource to DNS resolver 116.

As described above, other metadata, such as device metadata (e.g., device type), content type (e.g., live or video on demand), user metadata (e.g., user information such as subscriber information, user preferences, etc.), QoE information, etc. can also be passed to the CDN and utilized by resource selection layer 220 when selecting a resource to serve content to client 102. As one example, resource selection layer 220 can be configured to obtain policies with rules pertaining to various types of metadata. For example, a policy relevant to the particular device type of client 102 can be obtained, where the policy includes, for example, rules on what resources should be used (e.g., the policy can include a list of resources that have content encoded in a format usable by the device type of client 102).

Thus, as shown in the example environment of FIG. 2A, existing DNS mechanisms can be leveraged to pass client information and metadata to a CDN for advanced resource selection. In this example, while modifications are made to client 102 to encode new information in an augmented hostname, and to DNS name server 118 to extract and interpret information encoded in the augmented hostname, the mechanism by which DNS resolution is performed (e.g., the functionality of DNS resolver 116 in resolving URLs) is unchanged.

Second Example Technique—Modifying the CMS

Figure 2B:
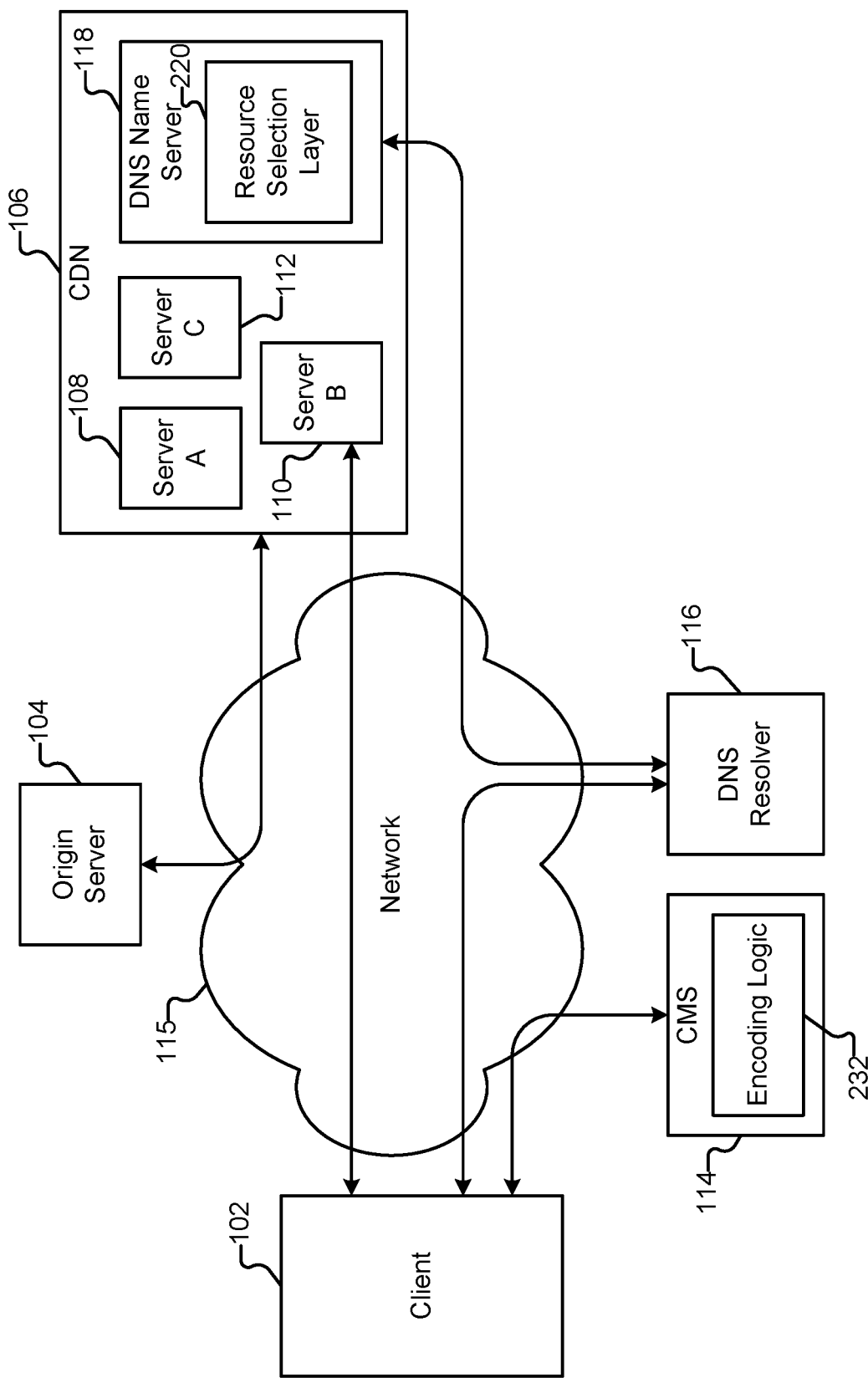
FIG. 2B illustrates an embodiment of an environment in which a second technique for facilitating advanced resource selection is performed.

FIG. 2B illustrates an embodiment of an environment in which a second technique for facilitating advanced resource selection is performed. In the example environment of FIG. 2A, client 102 was configured with additional logic to encode information such as client and content metadata into a hostname of a URL to be resolved. In some cases, such as for set-top boxes, it may be challenging to modify clients with the encoding logic. In the example environment of FIG. 2B, instead of modifying client 102 with encoding logic, a content management system such as content management system 114 is modified to perform the hostname augmentation described above in the example environment of FIG. 2A. Thus, advanced resource location can be facilitated without modifying client 102.

In the example shown, client 102 contacts CMS 114, requesting a URL for the episode of content "exampledrama" that the user of client 102 would like to watch. Instead of returning "a.cdn.net/content" to client 102, as in the example environments of FIGS. 1 and 2A, CMS 114 is configured with encoding logic 232 to augment the URL domain name or hostname "a.cdn.net" with metadata information such as client 102's IP address and the name of the content being requested. For example, because client 102 contacts CMS 114 directly and makes a request, CMS 114 is able to automatically obtain client 102's IP address (1.2.3.4) (e.g., using HyperText Transfer Protocol (HTTP) capabilities). Additionally, because client 102 makes a request for a specific content item, CMS 114 also has knowledge of the content being requested by the client ("exampledrama").

Thus, in this example, because CMS 114 has access to both client 102's IP address and the name of the requested content, the encoding logic 232 of CMS 114 is configured to insert (e.g., pre-pend) the information to the hostname "a.cdn.net" and generate the following URL: "exampledrama.1.2.3.4.a.cdn.net/content" with an augmented domain name. This augmented URL is then directly returned to client 102, which is configured to perform a DNS request for the augmented URL via DNS resolver 116, as described above, resulting in the augmented hostname with the client IP address and content name being passed to DNS name server 118 of CDN 106. In the example of FIG. 2B, resource selection layer 220 of DNS name server 118 has been similarly modified as in the example of FIG. 2A to be configured to extract the IP address and content name (and any other information) encoded in the augmented hostname. The resource selection layer 220 is then able to make a resource selection decision based on the client's actual IP address and the name of the requested content (or any other metadata), for example, returning the IP address of the closest resource to client 102 that has the requested content cached, similarly to as described in the example environment of FIG. 2A.

In this example, while modifications are made to CMS 114 to encode new information in an augmented hostname, and to DNS name server 118 to extract and interpret information encoded in the augmented hostname, client 102 and the mechanism by which DNS resolution is performed (e.g., the functionality of DNS resolver 116) are unchanged.

Third Example Technique—Intermediate Resolution Entity

Figure 2C:
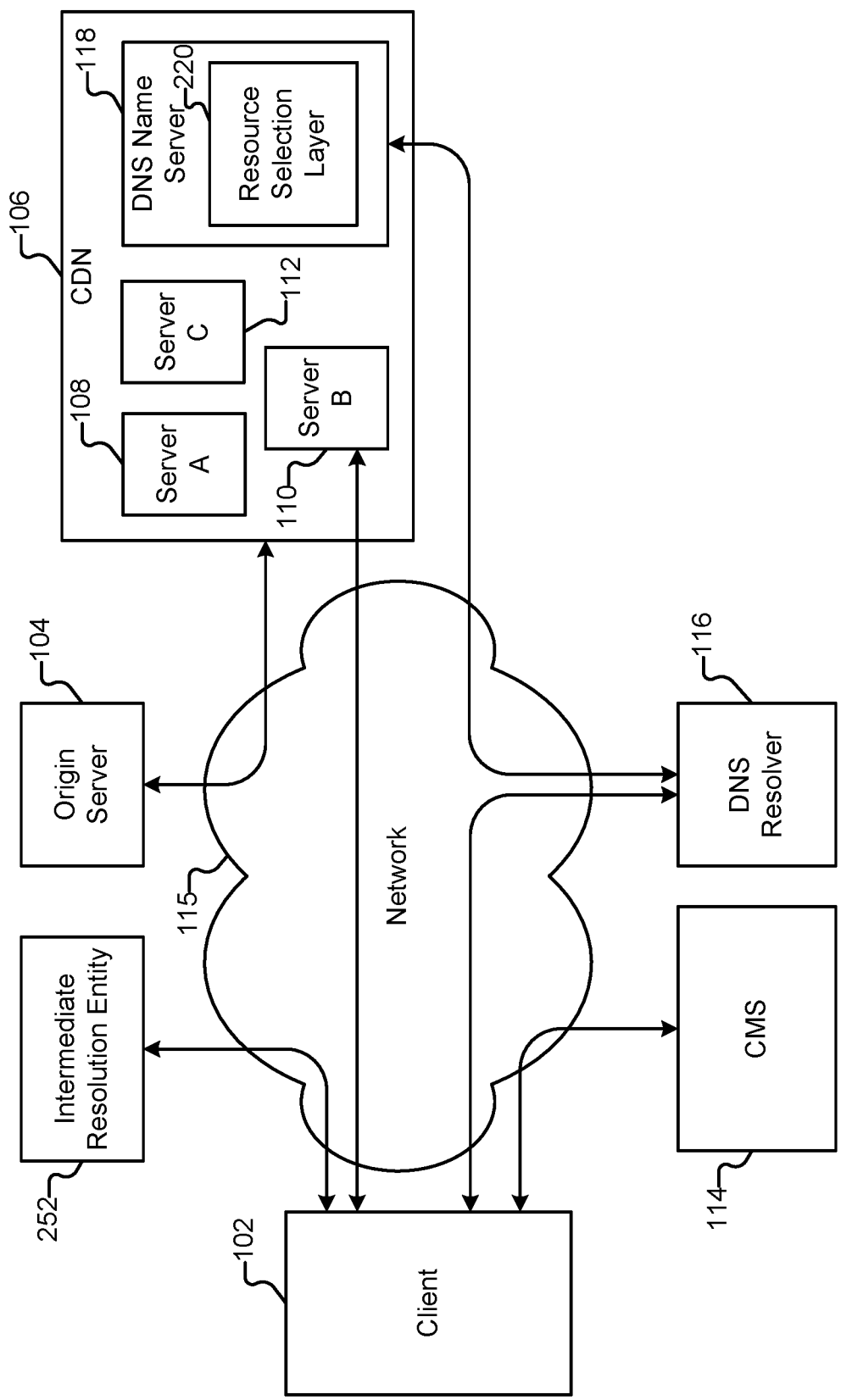
FIG. 2C illustrates an embodiment of an environment in which a third technique for facilitating advanced resource selection is performed.

FIG. 2C illustrates an embodiment of an environment in which a third technique for facilitating advanced resource selection is performed. In the example environment of FIG. 2B, CMS 114 was configured with additional logic to encode information such as client and content metadata (e.g., client IP address and requested content name), or any other metadata, as appropriate, into a hostname of a URL to be resolved. In some cases, it may be challenging to modify content management systems with the encoding logic. For example, some CMSs may be proprietary or older legacy systems may be difficult to change. As another example, the CMS may have a caching layer in front of it, making construction of device specific URLs infeasible or challenging.

In the example environment of FIG. 2C, similarly to the example environments of FIGS. 2A and 2B, a URL with an augmented hostname that has inserted metadata such as client IP address and content name is passed to resource selection layer 220 of DNS name server 118 that has been modified to extract and interpret such encoded information. As will be described in further detail below, the hostname augmenting is performed by an intermediate resolution entity (252), such that neither client 102 nor CMS 114 needs to be modified or updated with encoding logic to augment hostnames or domain names.

In the example environment of FIG. 2C, client 102 contacts CMS 114 to request the content item named "exampledrama." Rather than providing to client 102 a URL that will lead to DNS name server 118 of CDN 106 (e.g., a URL that has "cdn.net" as its domain), CMS 114 redirects client 102 to intermediate resolution entity (IRE) 252 by providing client 102 with a URL for IRE 252 (e.g., "a.ire.net/exampledrama"). In the example environment of FIG. 2C, the logic of CMS 114 is not modified to perform URL hostname (or domain name) augmentation as in the example environment of FIG. 2B. Instead, the CMS 114 is configured to return a different static URL (e.g., "a.ire.net/exampledrama" instead of "a.cdn.net/exampledrama").

Client 102 then contacts IRE 252 using the URL provided by CMS 114. IRE 252 is configured, similarly to as described above in the examples of FIGS. 2A and 2B, to construct an augmented URL that has encoded the IP address of client 102 (which IRE 252 obtains when client 102 contacts IRE 252) and the name of the requested content (which is obtained, for example, from the URL "a.ire.net/exampledrama" that was provided to client 102 by CMS 114 and used to contact IRE 252). In some embodiments, IRE 252 is configured to leverage or otherwise take advantage of full HyperText Transfer Protocol (HTTP) capabilities (versus only DNS capabilities) to retrieve the IP address of client 102 and metadata in HTTP headers and the URL provided to client 102 by CMS 114 and used to contact IRE 252.

Intermediate resolution entity 252, for example, constructs the URL:

"exampledrama.1.2.3.4.a.cdn.net/exampledrama".

In the example shown, IRE 252 responds to client 102 with the constructed (augmented) URL to client 102 using a redirect mechanism. For example, IRE 252 uses a (HTTP) 302 redirect to send client 102 to "exampledrama.1.2.3.4.cdn.net/exampledrama."

For example, upon receiving the HTTP 302 redirect request including the constructed URL, client 102 is configured to follow the redirect request and perform a DNS request to DNS resolver 116 using the constructed URL provided by IRE 252.

In some embodiments, clients such as client 102 are configured with default or basic logic to contact a CMS, obtain a URL from the CMS, and make an HTTP GET request on the URL provided by the CMS (e.g., that is resolved using DNS mechanisms such as those provided by DNS resolver 116). The default or basic logic of client 102 may then expect an IP address for a resource that client 102 can directly use to request content, but may not be configured or programmed to perform an additional step of contacting another URL (in this case to CDN 106 after having already visited IRE 252) before obtaining requested content. The HTTP 302 redirect mechanism causes the client to automatically contact CDN 106 without requiring, for example, modification to the logic of client 102 to perform additional HTTP GET requests (i.e., the HTTP 302 redirect mechanism forces client 102 to perform the additional step of contacting CDN 106 after having already been directed once to IRE 252).

Client 102 is redirected (e.g., by the HTTP 302 redirect mechanism) using the constructed URL generated by IRE 252 (which is resolved by DNS resolver 116, similarly to as described above) to DNS name server 118 of CDN 106. The hostname of the constructed URL, which includes the encoded client and content metadata information, is passed to DNS name server 118, where resource selection layer 220 is configured to extract and interpret the encoded information inserted in the augmented URL hostname or domain name. Layer 220 is configured to perform selection of a resource appropriate to client 102 (e.g., the resource closest to client 102 that has cached the content requested by client 102) based on the information encoded in the queried-for hostname, as described above in conjunction with the example environments of FIGS. 2A and 2B.

Intermediate resolution entity 252 is illustrated as a single logical device in FIG. 2C. In some embodiments, IRE 252 comprises standard commercially available server hardware (e.g., a multi-core process, 4+ Gigabytes of RAM, and one or more Gigabit network interface adapters) and runs typical server-class operating systems (e.g., Linux), as well as Java HTTP server software stack. Intermediate resolution entity 252 can also be implemented using a scalable, elastic architecture and may comprise several distributed components, including components provided by one or more third parties. Further, when IRE 252 is referred to herein as performing a task, such as storing data or processing data, it is to be understood that a sub-component or multiple sub-components of intermediate resolution entity 252 (whether individually or in cooperation with third party components) may cooperate to perform that task.

Figure 3:
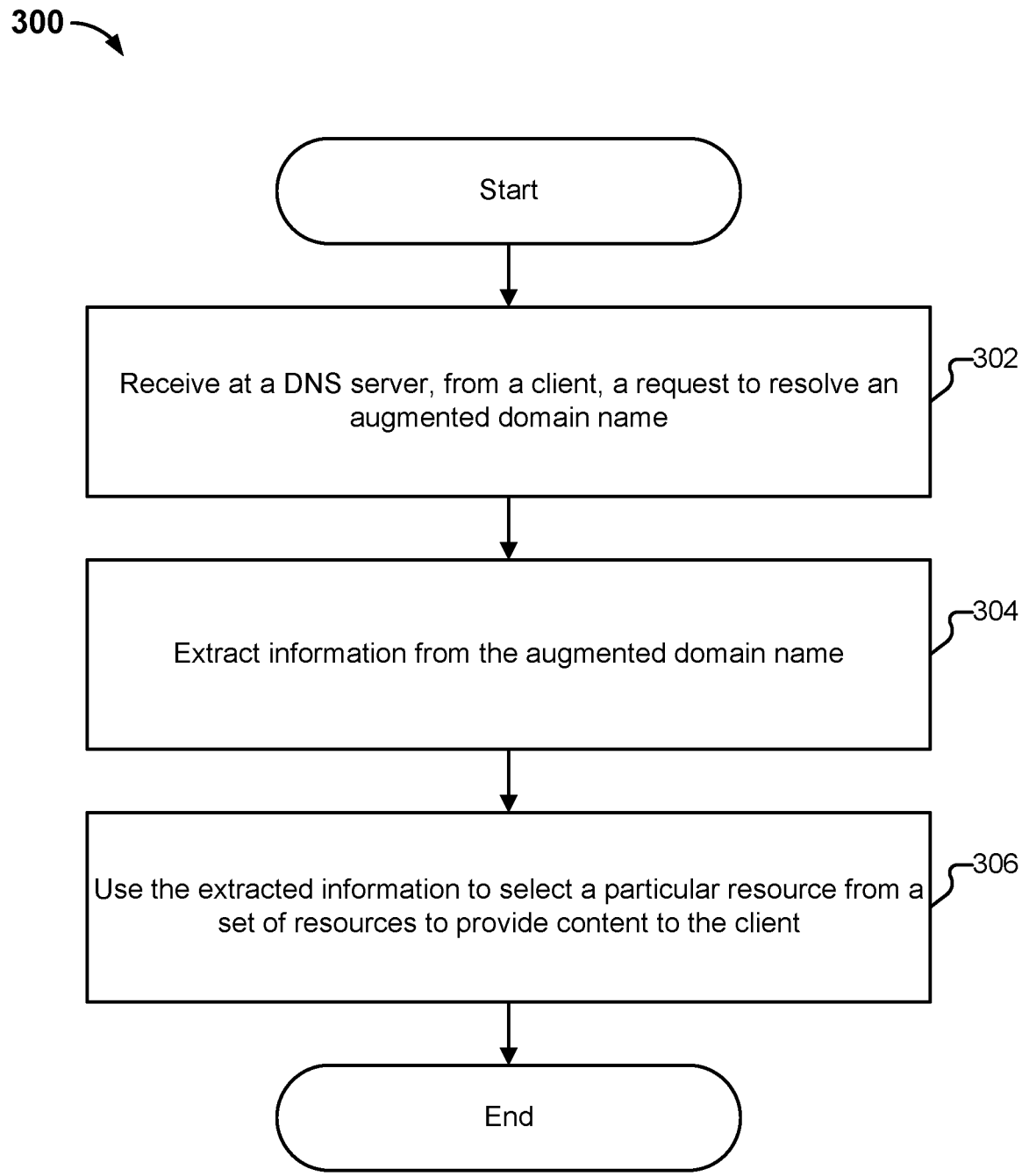
FIG. 3 is a flow diagram illustrating an embodiment of a process for advanced resource selection.

FIG. 3 is a flow diagram illustrating an embodiment of a process for advanced resource selection. In some embodiments, process 300 is executed by DNS name server 118 of FIGS. 2A, 2B, and 2C using resource selection layer 220. The process begins at 302 when a request to resolve an augmented domain name (or hostname) is received, from a client, at a DNS server (e.g., DNS name server 118). In some embodiments, the request is made by the client in conjunction with a video content request. In various embodiments, the augmented domain name has encoded within it various information associated with the client, such as the IP address of the client (or any other information usable to determine the geolocation of the client), content metadata, device metadata, user metadata, QoE metadata, and network metadata. One example of content metadata encoded in the augmented domain name includes a name of the content being requested. Another example of content metadata encoded in the augmented domain name includes a type (e.g., live or video on demand) of the content being requested. One example of device metadata includes a device type (e.g., smartphone, tablet, set-top box, gaming console, etc.). Examples of user metadata include user information (e.g., subscriber information, user preferences, etc.), QoE metrics (e.g., associated with re-buffering events, interrupt events, etc.), and network information (e.g., ISP of the client or network connection type such as 3G, 4G, LTE, etc.).

In some embodiments, the augmented domain name is generated by the client, for example, by modifying a URL provided by a CMS, as described in conjunction with FIG. 2A. In other embodiments, the augmented domain name is generated by a CMS, as described in conjunction with FIG. 2B. In other embodiments, the augmented domain name is generated by an intermediate resolution entity, and received at the DNS server in response to a 302 redirect request received by a client (e.g., initiated by the intermediate resolution entity), as described in conjunction with FIG. 2C. In some embodiments, the information is encoded in the augmented domain name by inserting (e.g., pre-pending) the information into a domain name or hostname string.

At 304, information is extracted from the augmented domain name. For example, the augmented domain name is processed and parsed (e.g., by resource selection layer 220) and the information encoded in the augmented domain name is extracted. At 306, the extracted information is used to select a particular resource from a set of resources to provide content to the client. In some embodiments, the selected resource is provided to the client. For example, the IP address of the selected resource is provided to the client (e.g., in response to a DNS resolution request for the URL that included the augmented domain name).

Fourth Example Technique—Protocol Layer

In the three example techniques described above, various entities such as clients, CMSs, and intermediate resolution entities were configured with logic to augment URL hostnames or domain names with client IP address, content name, or any other metadata in order to leverage or reuse existing DNS infrastructures and mechanisms to pass the more detailed information to a CDN so that the CDN can perform more accurate selection of a resource to serve content to a requesting client.

In the fourth example technique described below, client information such as client IP address, content information (e.g., content name, content type, etc.), client device information, user information, QoE information, etc. is passed to a CDN using a custom protocol, without requiring generating a customized URL and using a DNS-based infrastructure as described in the example environments of FIGS. 2A, 2B, and 2C.

In the second and third example techniques (described in conjunction with FIGS. 2B and 2C, respectively), either CMS 114 or intermediate resolution entity 252 has access to all of the information (e.g., client IP address, content name, content type, client device information, user information, QoE information, etc.) needed by the CDN to perform advanced resource selection. As will be described in conjunction with FIGS. 4A and 4B, a custom protocol can be directly built between entities such as CMS 114 and IRE 252 and a resource selection/resolution entity within CDN 106. The use of a direct communication protocol allows CMS 114 or IRE 252 to directly contact a resource selection entity in the CDN to obtain a resource selection result. In some embodiments, the resource selection result remains in the form of a DNS name, which is returned to a requesting client. The client then makes a request using the DNS name, which now maps to a specific resource (the resource selected by the resource selection entity in the CDN using the information passed via the protocol).

An example environment in which a protocol is built and used for direct communication between a CMS and a CDN is described below in conjunction with FIG. 4A. An example environment in which a protocol is built and used for direct communication between an intermediate resolution entity and a CDN is described below in conjunction with FIG. 4B.

FIG. 4A illustrates an embodiment of an environment in which advanced resource selection is facilitated. In the example environment of FIG. 4A, instead of having a resource selection layer inside of a DNS name server within CDN 106, as shown in conjunction with the example environments of FIGS. 2A, 2B, and 2C (e.g., resource selection layer 220), the logic of the resource selection layer is implemented as a component (402) within CDN 106 separate from a DNS name server.

In the example environment of FIG. 4A, a custom, descriptive protocol layer is built to facilitate direct communication between CMS 114 and resource selection entity 402 in CDN 106. When CMS 114 receives a request from client 102 for content, the CMS passes the IP address of client 102 and the name of the requested content (and any other metadata, as appropriate) via the protocol layer directly to resource selection entity 402. The resource selection entity 402 is configured to use the information passed via the protocol layer to determine a resource to serve the requested content to client 102, as described above. Resource selection entity 402 then responds to CMS 114 with a URL that has the hostname for the selected server. As one example, the resource selection result (e.g., selected server) is provided in the form of a DNS name that maps directly to the selected server. Suppose, for example, that server C 112 is selected by resource selection/resolution entity 402 as the appropriate server to provide content to client 102 (e.g., server C is the resource closest to client 102 that has the requested content). Resource selection entity 402 provides the URL (or DNS name) for server C (e.g., "serverC.a.cdn.net") to CMS 114 via the protocol layer directly built between CMS 114 and CDN 106.

CMS 114 then provides the URL for server C back to client 102 in response to client 102's initial request to CMS 114 for the content. Client 102 then makes a request (e.g., to a DNS resolver such as DNS resolver 116) to resolve the URL to server C. In response, client 102 is provided with the IP address for server C. In this example, the URL provided by CMS 114 will automatically resolve to server C, since the URL (e.g., DNS name of the URL) provided to client 102 maps specifically to server C.

FIG. 4B illustrates an embodiment of an environment in which advanced resource selection is facilitated. As in the example environment of FIG. 4A described above, instead of having a resource selection layer inside of DNS name server 118 of CDN 106, as shown in conjunction with the example environments of FIGS. 2A, 2B, and 2C, the resource selection logic is a separate component (402) within CDN 106.

In the example environment of FIG. 4B, a protocol layer is built that facilitates direct communication between intermediate resolution entity (IRE) 252 and resource selection entity 402 in CDN 106. When CMS 114 receives a request from client 102 for content, CMS 114 is configured to return a URL (e.g., "a.ire.net/exampledrama") to intermediate resolution entity 252. As described in the example environment of FIG. 2C, the intermediate resolution entity 252 leverages or takes advantage of full HTTP capabilities to retrieve the IP address of client 102 and other metadata, for example, in HTTP headers and the URL provided to client 102 by CMS 114 (e.g., the content name in the path of the URL).

In this example, IRE 252 then passes the retrieved client IP address and any other metadata to resource selection entity 402 within CDN 106 via the custom protocol layer. The resource selection entity 402 processes the information to determine an appropriate resource to serve content to client 102 (e.g., the resource closest to client 102 that has the requested content cached). The resource selection result, which in some embodiments is in the form of a DNS name that maps specifically to the selected resource, is then provided by resource selection entity 402 to IRE 252 via the protocol layer. In some embodiments, IRE 252 is configured to use a redirect mechanism (e.g., an HTTP 302 redirect request using the DNS name of the selected resource) to redirect client 102 to the selected resource to obtain the requested content.

Thus, in the example environments of FIGS. 4A and 4B, client IP address, content name, and any other metadata, as appropriate, can be passed to a CDN through a custom protocol without performing hostname encoding (as described in conjunction with FIGS. 2A, 2B, and 2C) and dealing with potential DNS limitations, such as limits on the length of the hostname (which can impact the amount of metadata that can be added to a hostname).

FIG. 5 is a flow diagram illustrating an embodiment of a process for advanced resource selection. In some embodiments, process 500 is executed by resource selection entity 402 of CDN 106 of FIGS. 4A and 4B. The process begins at 502 when information associated with a client requesting a content item is received at a resource selection entity within a CDN. The CDN includes a set of resources that serve multimedia content.

In some embodiments, the information is received from a CMS using a custom protocol, as described in conjunction with FIG. 4A. In other embodiments, the information is received from an intermediate resolution entity using a custom protocol, as described in conjunction with FIG. 4B.

In various embodiments, the information communicated via the protocol includes the IP address of the client, content metadata, device metadata, user metadata, QoE metadata, and network metadata, examples of which are described above.

At 504, the received information associated with the client (e.g., IP address and any other metadata) is used to select a particular resource in the set of resources to serve the requested content item to the client. In some embodiments, a DNS name mapping to the selected resource is provided to the client.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a set of one or more interfaces configured to receive, at a Domain Name System (DNS) server within a content delivery network, a request from a client to resolve an augmented domain name, wherein the client has previously made an initial request for content from a content management system, wherein the client generated the augmented domain name at least in part by inserting an Internet Protocol (IP) address of the client, a content name, and one or more measures indicative of a quality of a viewing experience of a user associated with the client device into a domain name of a URL provided to the client by the content management system in response to the initial request for content made by the client, and wherein the one or more measures indicative of the quality of the viewing experience of the user comprise information pertaining to re-buffering events;
a set of one or more processors configured to:
extract information from the augmented domain name, wherein the extracted information includes the Internet Protocol (IP) address, the content name, and the one or more measures indicative of the quality of the viewing experience of the user associated with the client inserted by the client into the domain name of the URL provided to the client by the content management system in response to the initial request for content made by the client;
use the information pertaining to the re-buffering events extracted from the augmented domain name generated by the client to select a particular resource from a set of resources included in the content delivery network to provide content to the client; and
provide as output to the client an address of the selected particular resource; and
a memory coupled to the set of one or more processors and configured to provide the set of one or more processors with instructions.

2. The system of claim 1 wherein the augmented domain name encodes content metadata including a content type.

3. The system of claim 1 wherein the augmented domain name encodes device information including a device type associated with the client.

4. The system of claim 1 wherein the augmented domain name encodes user information including at least one of subscriber information and user preferences.

5. The system of claim 1 wherein the augmented domain name encodes network information associated with the client.

6. A method, comprising:
receiving, via a set of one or more interfaces and at a Domain Name System (DNS) server within a content delivery network, a request from a client to resolve an augmented domain name, wherein the client has previously made an initial request for content from a content management system, wherein the client generated the augmented domain name at least in part by inserting an Internet Protocol (IP) address of the client, a content name, and one or more measures indicative of a quality of a viewing experience of a user associated with the client into a domain name of a URL provided to the client by the content management system in response to the initial request for content made by the client, and wherein the one or more measures indicative of the quality of the viewing experience of the user comprise information pertaining to re-buffering events;
extracting information from the augmented domain name, wherein the extracted information includes the Internet Protocol (IP) address, the content name, and the one or more measures indicative of the quality of the viewing experience of the user associated with the client inserted by the client into the domain name of the URL provided to the client by the content management system in response to the initial request for content made by the client;
using the information pertaining to the re-buffering events extracted from the augmented domain name generated by the client to select, using a set of one or more processors, a particular resource from a set of resources included in the content delivery network to provide content to the client; and
providing as output to the client an address of the selected particular resource.

7. The method of claim 6 wherein the augmented domain name encodes content metadata including a content type.

8. The method of claim 6 wherein the augmented domain name encodes device information including a device type associated with the client.

9. The method of claim 6 wherein the augmented domain name encodes user information including at least one of subscriber information and user preferences.

10. The method of claim 6 wherein the augmented domain name encodes network information associated with the client.

11. A computer program product embodied in a non-transitory computer readable storage medium and comprising computer instructions for:
receiving, via a set of one or more interfaces and at a Domain Name System (DNS) server within a content delivery network, a request from a client to resolve an augmented domain name, wherein the client has previously made an initial request for content from a content management system, wherein the client generated the augmented domain name at least in part by inserting an Internet Protocol (IP) address of the client, a content name, and one or more measures indicative of a quality of a viewing experience of a user associated with the client into a domain name of a URL provided to the client by the content management system in response to the initial request for content made by the client, and wherein the one or more measures indicative of the quality of the viewing experience of the user comprise information pertaining to at least one of re-buffering events or interrupt events;
extracting information from the augmented domain name, wherein the extracted information includes the Internet Protocol (IP) address, the content name, and the one or more measures indicative of the quality of the viewing experience of the user associated with the client inserted by the client into the domain name of the URL provided to the client by the content management system in response to the initial request for content made by the client;

using at least some of the information extracted from the augmented domain name generated by the client to select, using a set of one or more processors, a particular resource from a set of resources included in the content delivery network to provide content to the client; and providing as output to the client an address of the selected particular resource.

12. A system, comprising:

a set of one or more interfaces configured to receive, at a resource selection entity within a content distribution network and separate from a DNS name server, information associated with a client requesting a content item, wherein the content distribution network comprises a set of resources that serve multimedia content, wherein the information is received via a protocol layer directly established between a content management system and the resource selection entity within the content distribution network, wherein the information is received via the protocol layer in response to the client requesting the content item from the content management system, wherein the information received via the protocol layer comprises an Internet Protocol (IP) address of the client, a content name, and one or more measures indicative of a quality of a viewing experience of a user associated with the client, and wherein the one or more measures indicative of the quality of the viewing experience of the user comprise information pertaining to re-buffering events;

a set of one or more processors configured to:
  use, by the resource selection entity within the content distribution network and separate from a DNS name server, the information pertaining to re-buffering events received via the protocol layer directly established between the content management system and the resource selection entity to select a particular resource in the set of resources to provide the requested content item to the client; and
  provide, to the content management system via the protocol layer, a DNS name that maps to the selected particular resource, wherein the content management system is configured to respond to the request by the client for the content item at least in part by providing, to the requesting client, a URL that comprises the DNS name of the selected particular resource to the client, wherein the client is configured to use the URL provided by the content management system that includes the DNS name that maps to the selected particular resource to make a subsequent request for the content item; and a memory coupled to the set of one or more processors and configured to provide the set of one or more processors with instructions.

* * * * *

UNITED STATES PATENT AND TRADEMARK OFFICE
CERTIFICATE OF CORRECTION

PATENT NO. : 11,303,604 B2
APPLICATION NO. : 15/080452
DATED : April 12, 2022
INVENTOR(S) : Hui Zhang and Aditya Ravikumar Ganjam It is certified that error appears in the above-identified patent and that said Letters Patent is hereby corrected as shown below:

In the Claims

In Column 13, Line(s) 22, Claim 1, after "client", delete "device".

Signed and Sealed this
Twenty-ninth Day of November, 2022

Katherine Kelly Vidal
*Director of the United States Patent and Trademark Office*